US005685592A

United States Patent [19]
Heinz

[11] Patent Number: 5,685,592
[45] Date of Patent: Nov. 11, 1997

[54] CARGO COMPARTMENT COVER AND ITEM SUPPORT ASSEMBLY

[75] Inventor: Mark F. Heinz, Toledo, Ohio

[73] Assignee: United Technologies Automotive, Inc., Dearborn, Mich.

[21] Appl. No.: 576,666

[22] Filed: Dec. 21, 1995

[51] Int. Cl.⁶ .................................................. B60R 3/08
[52] U.S. Cl. .......................... 296/37.16; 296/37.8
[58] Field of Search ........................ 296/37.16, 37.6, 296/37.8, 98, 100

[56] References Cited

U.S. PATENT DOCUMENTS

| | | |
|---|---|---|
| 4,139,231 | 2/1979 | Lang et al. . |
| 4,168,094 | 9/1979 | Yagi . |
| 4,277,097 | 7/1981 | Lalanne .................. 296/37.16 |
| 4,479,675 | 10/1984 | Zankl ...................... 296/37.16 |
| 4,540,213 | 9/1985 | Herlitz et al. . |
| 4,671,557 | 6/1987 | Lemp . |
| 4,932,704 | 6/1990 | Ament . |
| 5,121,958 | 6/1992 | Goeden et al. . |
| 5,207,260 | 5/1993 | Commesso . |
| 5,378,035 | 1/1995 | Wu ........................... 296/98 X |
| 5,415,457 | 5/1995 | Kifer . |
| 5,464,052 | 11/1995 | Wieczorek et al. . |

Primary Examiner—Joseph D. Pape
Attorney, Agent, or Firm—William W. Habelt

[57] ABSTRACT

A motor vehicle compartment cover and item support assembly (20) is provided for use in a motor vehicle (10) having a cargo compartment (5). A selectively deployable cover (30) is attached at its trailing edge portion (32) to a cover support member (40) and at least one item support member (50) is secured to the leading edge portion (34) of the cover (30). The item support member may comprise a storage tray (60), a container receptacle (70), a retainer hook (80), or any combination or plurality of such support items. A handle (90) may be provided, advantageously mounted to or formed integral with the item support member, to facilitate deployment of the cover. Attachment members (54, 56) may be provided, advantageously mounted to or formed integral with the item support member, to facilitate attachment of the leading edge portion of the cover, when deployed, to the vehicle.

20 Claims, 2 Drawing Sheets

CARGO COMPARTMENT COVER AND ITEM SUPPORT ASSEMBLY

TECHNICAL FIELD

The present invention relates generally to stowable covers for use when fully deployed to cover the storage area of a windowed rear compartment of an automotive vehicle, such as a sport utility vehicle, a hatchback or a station wagon. More particularly, the present invention relates to a vehicle rear compartment cover assembly incorporating an item support member for conveniently holding or otherwise retaining items, for example drink containers, handled grocery bags or personal objects.

BACKGROUND ART

Automotive vehicles such as sport utility vehicles, hatchbacks, station wagons and the like have a rear storage compartment extending within the vehicle cabin from behind the rear seat to the rear door of the vehicle. These vehicles are typically provided with a rear window extending across an upper portion of the rear door and also rear side windows extending along the sides of the vehicle. Although ensuring rearward viewability for the convenience of the occupants of the vehicle, the rear and side windows render the rear storage compartment visible from the exterior of the vehicle. Therefore, items stored in the rear compartment can be viewed by a potential thief, who, after having seen what items may be present, may then decide to break into the vehicle.

In order to conceal items stowed within the rear storage compartment of the vehicle from view, a cover may be installed over the rear storage compartment at a height just below the bottom extent of the vehicle's rear and side windows. One particular cover adapted for this purpose is a retractable surface, such as a fabric shade retractably supported on a roller, for example such as shown in U.S. Pat. Nos. 4,139,231; 4,168,094 and 4,671,557, or such as a flexible, foldable web retractably supported on opposed guide rails, for example such as shown in U.S. Pat. No. 4,932,704. When fully deployed, such covers extend longitudinally from behind the rear seat to the rear door, and transversely from side panel to side panel, so as to close the compartment from view. U.S. Pat. No. 4,139,231 discloses a cover assembly for use in covering the windowed rear compartment of an automotive vehicle such as a hatchback or station wagon. The disclosed compartment cover comprises a substantially rectangular flexible sheet member anchored to and wrapped around a spring-loaded, cylindrical roller adapted to be secured to the vehicle so as to extend along one side of the compartment. The roller is rotatable about its longitudinal axis whereby the flexible sheet member may be unrolled so as to extend across the compartment and be attached to the opposite side of the compartment. The flexible member is sized for the particular vehicle in which it is to be used to have sufficient length and width to cover substantially all of the compartment over which it is deployed, thereby concealing the contents of the compartment from view by a casual observer looking in from outside the vehicle.

It is also known to provide retainers, such as hooks, on the back of a seat for supporting handled plastic shopping bags. For example, U.S. Pat. No. 5,415,457 discloses a retainer assembly which is integrally mounted on a vehicle seat back and includes a row of spaced hooks on which handled bags, such as plastic grocery bags, may be hung by their handles. Although a desirable convenience, such a retainer assembly would be difficult and cumbersome to utilize on the back of a rear seat of a hatchback, station wagon, sport utility vehicle or like vehicle equipped with a rear compartment cover which when stowed is disposed so as to extend along an upper portion of the back of the rear seat.

It is also known to provide cup holders and storage trays at various locations, such as the side panels and center consoles, in the vicinity of the rear seat to provide passengers seated in the rear seat convenient means for holding drinks and retaining personal items.

SUMMARY OF THE INVENTION

It is an object of the present invention to provide a cargo compartment cover assembly having a deployable cover and including at least one item support member mounted to the deployable cover.

In accordance with the present invention, there is provided a motor vehicle compartment cover and item support assembly suitable for use in a motor vehicle having a cargo compartment. The cover member is attached at its trailing edge portion to a cover support member and at least one item support member is secured to the leading edge portion of the cover member. The leading edge portion of the cover member is selectively deployable from a stowed position proximate its trailing edge portion to at least one deployed position remote from its trailing edge portion. The one item support member may comprise a storage tray, a container receptacle, a retainer hook, or any combination or plurality of such support items. A handle may be provided, advantageously mounted to or formed integral with the item support member, to facilitate deployment of the cover member. Attachment members may be provided at the opposite ends of the leading edge portion of the cover member, advantageously mounted to or formed integral with the item support member, to facilitate attachment of the leading edge portion of the cover member when deployed to the vehicle.

BRIEF DESCRIPTION OF THE DRAWINGS

Further features, advantages and characteristics of the present invention will become apparent from the following detailed description with reference to the accompanying drawings wherein.

DETAILED DESCRIPTION OF A PREFERRED EMBODIMENT

Figure 1:
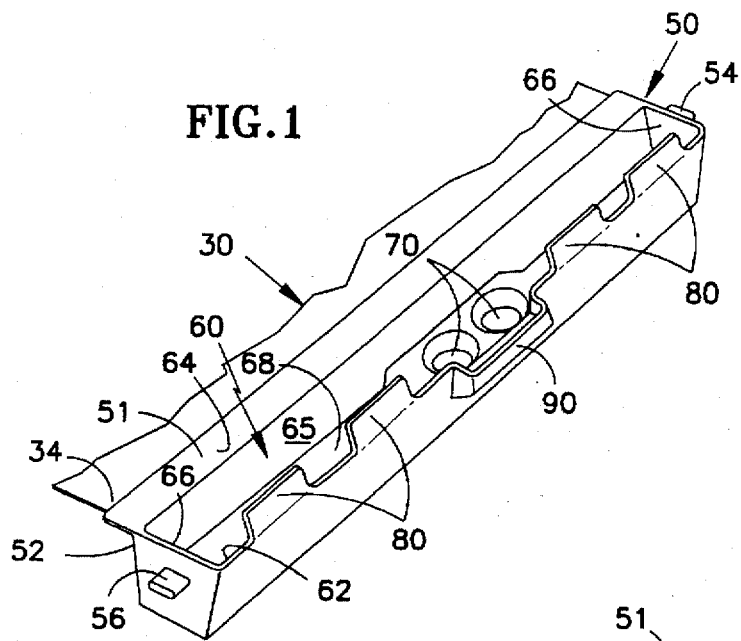
FIG. 1 is a perspective view of the leading edge portion of the cargo compartment cover and item support assembly of the present invention.
Figure 2:
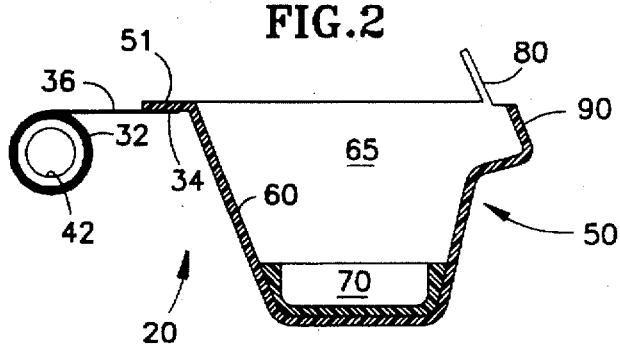
FIG. 2 is sectional, side elevational view taken along line 2—2 of FIG. 3.

Referring now to the drawing, the cargo compartment 5 of a conventional sport utility vehicle 10 is depicted as viewed from the rear of the vehicle with the rear access door (not shown) in its fully open position. The cargo compartment 5 is that region of the vehicle cabin lying rearward of the back seat 12 of the sport utility vehicle intended for temporary storage of personal items, such as for example sporting goods, tools, suitcases, children's toys, beach items, baby equipment, and the like or groceries, shopping purchases or other cargo items, during travel or shopping or running about town. Although the present invention will be described herein for purposes of illustration, but not limitation, with reference to a sport utility vehicle, it is to be understood that the present invention is equally applicable to other vehicles such as a hatchback, a station wagon or like vehicles having a back seat with a storage region provided rearward of the back seat that is conventionally intended for temporary storage of personal items.

Figure 3:
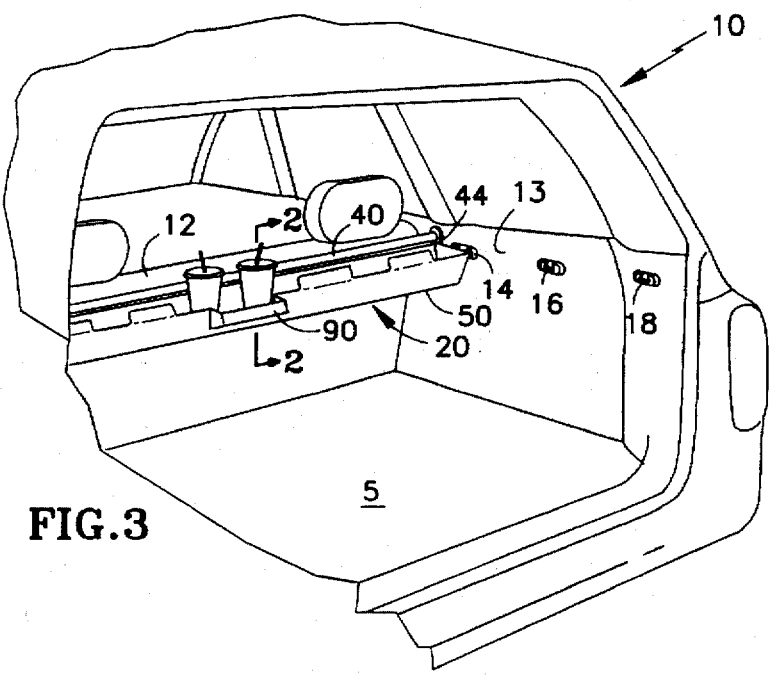
FIG. 3 is a perspective view of the cargo compartment of a sport utility vehicle showing the cargo compartment cover and item support assembly of the present invention in its installed stowed position.
Figure 4:
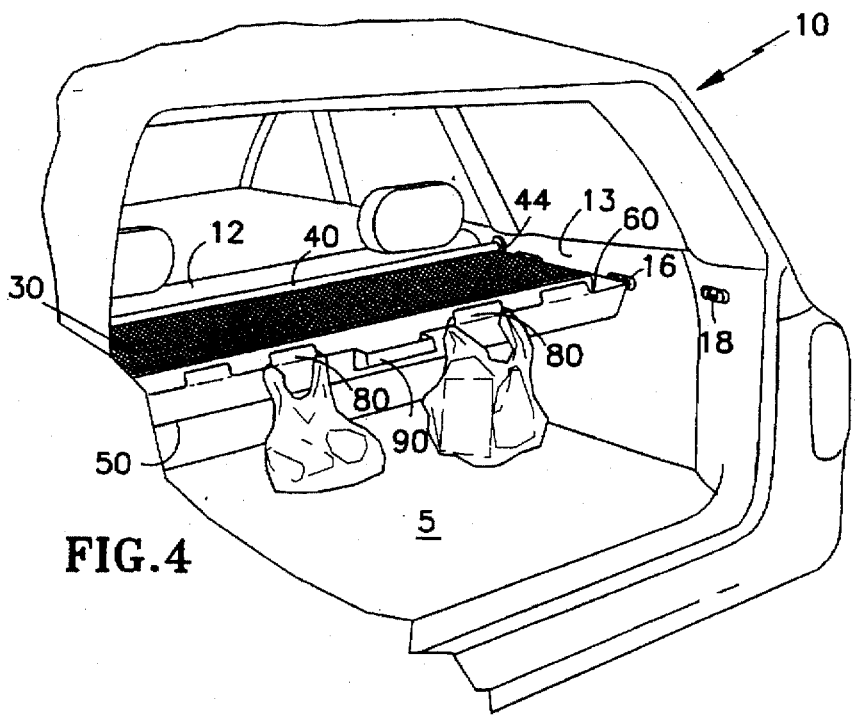
FIG. 4 is a perspective view of the cargo compartment of a sport utility vehicle showing the cargo compartment cover and item support assembly of the present invention with the cover partially deployed.
Figure 5:
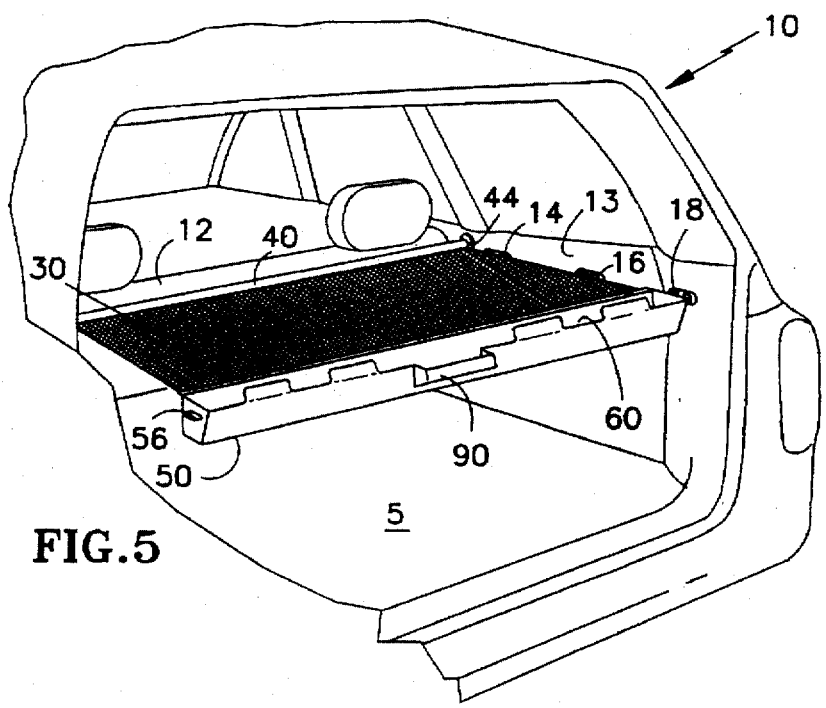
FIG. 5 is a perspective view of the cargo compartment of a sport utility vehicle showing the cargo compartment cover and item support assembly of the present invention with the cover fully deployed.

For purposes of illustration and discussion of a preferred best mode embodiment, the cargo compartment cover and item support assembly 20 of the present invention is depicted in FIG. 1 in a perspective view prior to installation into the vehicle and is depicted in FIGS. 3, 4 and 5 in various functional positions when installed in the vehicle 10. The cover and item support assembly of the present invention comprises a selectively deployable cover member 30 secured to a cover support member 40 and at least one item support member 50. The cover member 30 has a trailing edge 32 by which it is secured to the cover support member 40 and a leading edge 34 to which at least one item support member 50 is secured. The leading edge 34 is selectively deployable from a stowed position proximate the trailing edge 32, as depicted in FIG. 3, to at least a fully deployed position remote from the trailing edge 32, as depicted in FIG. 5, so as to cover the cargo compartment 5 of the vehicle 10. In the depicted embodiment, the leading edge 34 of the cover member 30 is also deployable at an intermediate position, as depicted in FIG. 4, wherein the cover member 30 partially covers the cargo compartment 5 of the vehicle 10.

As depicted in the embodiment of the cover and item support assembly 20 illustrated in the drawing, the cover member 30 comprises a flexible cover sheet 36, made of conventional fabric, plastic or fiber-reinforced plastic material, having a width substantially co-extensive with the transverse span of the cargo compartment 5 of the vehicle 10 into which the cover and item support assembly 20 is to be installed and a length at least of sufficient extent to cover the longitudinal extent of the cargo compartment 5 from immediately behind the back of the rear seat 12 to the rear door opening of the vehicle 10 into which the cover and item support assembly 20 is to be installed. When installed in the vehicle 10, the cover support member 40 is mounted to the opposite side panels of the vehicle 10 in a conventional manner so as to be supported at each of its longitudinally opposite ends by the side panels so as to extend transversely across the vehicle 10 immediately behind the rear seat 12.

The cover support member 40 includes a rotationally biased elongated roller tube 42 extending along a longitudinal axis and end caps 44 operatively associated with the roller tube 42 and mounted to the respective opposite longitudinally spaced ends of the roller tube 42. The trailing edge portion 32 of the flexible cover sheet 36 may be secured to the roller tube 42, for example by an adhesive, by an anchor groove or by other attachment means known to those skilled in the art. In accordance with conventional practice, the end caps 44 are adapted to be received in appropriate receptors in the opposed side panels of the vehicle for mounting the cover support member 40 to the vehicle 10 in supporting relationship therewith and in such a manner that the cover member 30 may be readily unwrapped from the roller tube 42 by pulling on the leading edge 34 of the cover sheet 30, as one would pull on a window shade, to selectively deploy the cover member 30 over the cargo compartment 5. The particular construction of the roller tube 42 and the operatively associated end caps 44 is not germane to the present invention and any of a number of conventional constructions well known to those skilled in the art may be used. Axially compressible, spring-biased end caps may be used to facilitate installation and removal from the vehicle. To provide the desired rotational bias necessary to rewind the cover sheet 36 around the roller tube 42 when it is desired to release the cover member 30 from a deployed position, any conventional known rotational bias means (not shown) may be used, such as for example a torsion spring operatively disposed within a hollow roller tube 42 or a coil spring operatively disposed within one or both of the end caps 44. The particular form of rotational bias means used is not germane to the present invention.

The item support member 50 of the cover and item support assembly 20 of the present invention comprises a rigid support member 52 extending along and secured to the leading edge portion 34 of the cover member 30. The rigid support member 52 may advantageously have a lip 51 to facilitate securing of the rigid support member 52 to the leading edge 34 of the cover member 30. The rigid support member 52 is advantageously permanently secured to the cover member 30 by dielectric bonding, adhesive bonding, pinning or otherwise permanently fixing the lip 51 to the cover member 30. However, if it is desired to provide for removability of the rigid support member 52 from the cover member 30 to allow for interchangeability or replacement of the rigid support member 52, the rigid support member 52 may be releaseably secured to the cover member 30 by bolts, snaps, mating hook and loop fabric connectors and other known releasable mounting means. Advantageously, the rigid support member 52 extends along substantially the entire extent of the leading edge portion 34 of the cover member 30 and has attachment members 54 and 56 at its longitudinally opposite ends. The attachment members 54 and 56 are adapted to mate with or fit into respective paired sets of attachment receptors 14, 16, 18 disposed in the opposed side panels or other trim member bounding the cargo compartment 5 of the vehicle 10. Although only the attachment receptors 14, 16 and 18 provided in the side panel 13 for receiving the attachment member 54 are shown in the drawing, it is to be understood that respective paired receptors are provided in the opposing side panel for receiving the attachment member 56 of the rigid support member 52 of the item support member 50.

In the depicted embodiment, the item support member 50 comprises a storage tray 60, a pair of cup holders 70 and a plurality of retainer hooks 80, all formed integrally in one molded rigid member which itself constitutes the rigid support member 52 of the item support member 50 and includes attachment members 54 and 56. The storage tray 60 has a forward wall 62, a rearward wall 64, opposed side walls 66 and a bottom 68 which form a continuous structure defining an elongated trough 65 which provides recess storage sections on opposite sides of the centrally located cup holders 70, advantageously formed as recesses in the bottom 68 of the storage tray 60. The trough 65 provides storage volume for small personal items, such as for example portable radios and headphones, sunglasses, gloves or mittens and the like. The cup holders 70 provide a convenient receptacle directly behind the rear seat for passengers in the rear seat to stow drinking cups. The retainer hooks 80, which advantageously comprise integral lips extending upwardly and arching forwardly from the rearward wall 64 of the storage tray 60, provide a very convenient support for holding handled containers such as plastic grocery bags and shopping bags. A handle 90 may also be provided on the rigid support member 52, advantageously formed integrally therewith so as to extend rearwardly from the wall of the storage tray 60, for facilitating placement of the cover member 30 between its stowed and various deployed positions.

Although depicted in a particularly advantageous configuration wherein the item support member 50 of the cover and item support assembly 30 of the present invention incorporates a storage tray 60, a pair of cup holders 70 and multiple retainer hooks 80 integrally formed as a single piece which itself constitutes a rigid support member 52 secured to the leading edge 34 of the cover member 30, the item support member 50 alternately may comprise any combination of one or more of a storage tray 60, a cup holder 70 or a retainer hook 80. For example, in an alternate embodiment, the item support member 50 may simply comprise a storage tray 60 alone, or a storage tray 60 with at least one cup holder 70 but without any retainer hook 80, or a storage tray 60 with at least one retainer hook 80 but without any cup holder 70. The item support member 50 may in a further alternate embodiment, for example, comprise at least one cup holder mounted to or formed integrally with a rigid support member 52 but without any storage tray 60 or retainer hook 80, or the item support member 50, may, if desired, for example, comprise at least one retainer hook 80 mounted to or formed integrally with a rigid support member 52 but without any storage tray 60 or cup holder 70. In a still further alternate embodiment, the item support member 50 may, for example, comprise at least one cup holder 70 and at least one retaining hook 80, mounted to or formed integrally with a rigid support member 52, but without a storage tray 60.

Referring now in particular to FIGS. 3, 4 and 5, the cargo compartment cover and support item assembly 20 of the present invention is depicted in three different functional positions. Irrespective of the particular configuration of the item support member 50, the cover and item support assembly 20 of the present invention is installed in the vehicle 10 immediately rearward of the seat 12 bordering the forward extent of the cargo compartment 5 of the vehicle 10. The cover and item support assembly 20 is installed in a conventional manner by placing the end caps 44 of the cover support member 40 in appropriate receptors in the opposed side panels of the vehicle for supporting the cover support member 40 so as to extend transversely across the vehicle 10. Advantageously, the cover and item support assembly 20 is installed in a conventional manner to be readily removable from the vehicle 10 in the event that it is desired to tilt the seat 12 forward to provide availability of the full cabin rearward of the driver's seat for stowage. In the first position, also referred to herein as the stowed position, as depicted in FIG. 3, the cover sheet 36 is substantially completely wrapped about the roller tube 42 of the cover support member 40. In this stowed position, the cargo compartment 5 of the vehicle is uncovered and the leading edge 34 of the cover sheet 36 is disposed proximate the trailing edge 32 of the cover sheet 36 secured to the roller support tube 42 of the cover support member 40. Thus, the item support member 50 is disposed immediately behind the seat 12 whereat it is conveniently accessible to the passengers sitting in the seat 12. To provide support for leading edge portion of the cover member 30 and the item support member 50, the attachment members 54 and 56 are disposed in the respective opposed receptors 14 of the forward pair of attachment receptors in the side panels of the vehicle 10.

In its fully deployed position, as depicted in FIG. 5, the cover sheet 36 has been pulled from its stowed position to extend substantially completely across the width and along the entire length of the cargo compartment 5 of the vehicle 10 so as to cover the cargo compartment 5, thereby precluding individuals outside the vehicle 10 from viewing the contents of the cargo compartment 5 through the windows of the vehicle 10. In this position, the leading edge portion 34 of the cover sheet 36 is disposed remote from the trailing edge portion 32 of the cover sheet 36 which remains secured to the roller tube 42 of the cover support member 40 which remains in its supported position immediately behind the seat 12. To support the item support member 50 in this position, the attachment members 54 and 56 are disposed in the respective opposed receptors 18 of the rearward pair of attachment receptors in the side trim of the vehicle 10. In the fully deployed position, item support member 50 is disposed remotely from the seat 12 and thus no longer conveniently accessible to the passengers in the seat 12. However, the item support member 50 is now disposed at the rear opening of the vehicle 10 and thus accessible from the exterior of the vehicle and available for use, for example, to hold drink cups or personal items at tailgate parties.

In an intermediate position, as depicted in FIG. 4, the cover sheet 36 has been partially pulled from its stowed position and unwrapped from the roller tube 42 to extend only partially along the length of the cargo compartment 5 of the vehicle 10 so as to cover only a forward portion of the cargo compartment 5. In this intermediate position, the leading edge 34 of the cover sheet 36 is also disposed remote from the trailing edge portion 32 of the cover sheet 36 which remains secured to the roller tube 42 of the cover support member 40, but not as remotely as in the fully deployed position, while the cover support member again 40 remains in its supported position immediately behind the seat 12. To support the item support member 50 in this intermediate position, the attachment members 54 and 56 are disposed in the respective opposed receptors 16 of the intermediate pair of attachment receptors in the side trim of the vehicle 10. In this partially deployed, intermediate position, item support member 50 is disposed remotely from the seat 12 and thus also no longer conveniently accessible to the passengers in the seat 12. However, the item support member 50 is now accessible from the exterior of the vehicle and available for use in supporting handled items, for example, plastic grocery bags or shopping bags by hanging the handles of the bags about the retainer hooks 80 while the filled bag occupies the exposed region of the cargo compartment 5 rearward of the intermediate position.

Although the dover and item support assembly 20 of the present invention has been described herein in a particularly advantageous embodiment wherein the cover member 30 comprises a flexible cover sheet 36 mounted on a roller tube 42, it is to be understood that the cover member 30 may comprise any form of cover member which is deployable from a stowed position in which the cargo compartment 5 is uncovered for access to at least one intermediate position and a fully deployed position. For example, the cover member 30 may comprise a flexible web slidable on guide rails on the side panels from a folded stowed position to deployed position extending above the cargo compartment as shown in U.S. Pat. No. 4,932,704. Rigid, as opposed to flexible, cover members may also be used in the cargo compartment cover and item support assembly of the present invention. For example, the cover member 30 of the cover and item support assembly 20 may comprise a multi-sectioned, rigid sheet wherein the sections are hinged so as to be foldable one against another in the stowed position, but deployable to a fully deployed position by completely unfolding the sections and deployable to an intermediate position by only partially unfolding the sections, such that the item support member 50 is disposed directly behind the seat 12 when the cover member is stowed.

It is to be understood that the invention is not limited to the particular embodiment illustrated and discussed hereinbefore, but that various changes and modifications, some of which have been alluded to hereinbefore, may be made without departing from the spirit and scope of the present invention as defined by the claims as set forth below, and the equivalents thereof.

I claim:

1. A cargo compartment cover and item support assembly for use in a motor vehicle having a cargo compartment, said assembly comprising:

a cover member having a trailing edge and a leading edge, the trailing edge secured to a cover support member and the leading edge being selectively deployable from a stowed position proximate the trailing edge to at least one deployed position remote from the trailing edge; and at least one item storage member secured to the leading edge of said cover member.

2. A compartment cover and item support assembly as recited in claim 1 wherein said item support member comprises a storage tray.

3. A compartment cover and item support assembly as recited in claim 1 wherein said item support member comprises a cup holder.

4. A compartment cover and item support assembly as recited in claim 1 wherein said item support member comprises a retainer hook.

5. A compartment cover and item support assembly as recited in claim 1 wherein said item support member comprises an elongated storage tray extending along the leading edge of said cover member, said storage tray including at least one cup holder.

6. A compartment cover and item support assembly as recited in claim 1 wherein said item support member comprises an elongated storage tray extending along the leading edge of said cover member, said storage tray including at least one retainer hook.

7. A compartment cover and item support assembly as recited in claim 1 wherein said item support member comprises at least one cup holder and at least one retainer hook.

8. A compartment cover and item support assembly as recited in claim 1 wherein said item support member comprises an elongated storage tray extending along the leading edge of said cover member, said storage tray including at least one cup holder and at least one retainer hook.

9. A compartment cover and item support assembly as recited in claim 1 wherein said item support member comprises an elongated storage tray extending along the leading edge of said cover member, said storage tray including at least one cup holder and at least one retainer hook, said storage tray having attachment means at each of its opposite ends for releasably attaching said storage tray to the vehicle.

10. A compartment cover and item support assembly as recited in claim 9 further comprising a handle extending forwardly from said storage tray for facilitating deployment of the cover member.

11. A cargo compartment cover and item support assembly for use in a motor vehicle having a cargo compartment, said assembly comprising:

a cover support member including a rotationally biased elongated roller tube extending along a longitudinal axis and having first and second longitudinally spaced ends adapted for mounting the roller tube to the vehicle whereby the roller tube is rotatable about the longitudinal axis;

a flexible cover sheet member having a trailing edge and a leading edge, the trailing edge secured to the roller tube, the sheet member being wrapped about the roller tube when in a stowed position and being selectively deployable to position the leading edge at least one deployed position remote from the trailing edge; and at least one item storage member secured to the leading edge of said cover member.

12. A compartment cover and item support assembly as recited in claim 11 wherein said item support member comprises a storage tray.

13. A compartment cover and item support assembly as recited in claim 11 wherein said item support member comprises a cup holder.

14. A compartment cover and item support assembly as recited in claim 11 wherein said item support member comprises a retainer hook.

15. A compartment cover and item support assembly as recited in claim 11 wherein said item support member comprises an elongated storage tray extending along the leading edge of said cover member, said storage tray including at least one cup holder.

16. A compartment cover and item support assembly as recited in claim 11 wherein said item support member comprises an elongated storage tray extending along the leading edge of said cover member, said storage tray including at least one retainer hook.

17. A compartment cover and item support assembly as recited in claim 11 wherein said item support member comprises at least one cup holder and at least one retainer hook.

18. A compartment cover and item support assembly as recited in claim 11 wherein said item support member comprises an elongated storage tray extending along the leading edge of said cover member, said storage tray including at least one cup holder and at least one retainer hook.

19. A compartment cover and item support assembly as recited in claim 11 wherein said item support member comprises an elongated storage tray extending along the leading edge of said cover member, said storage tray including at least one cup holder and at least one retainer hook, said storage tray having attachment means at each of its opposite ends for releasably attaching said storage tray to the vehicle.

20. A compartment cover and item support assembly as recited in claim 19 further comprising a handle extending forwardly from said storage tray for facilitating deployment of the cover member.

* * * * *